(12) United States Patent
Lykov

(10) Patent No.: US 9,289,664 B2
(45) Date of Patent: Mar. 22, 2016

(54) APPARATUS FOR UNDERWATER ACTIVITIES

(71) Applicant: WATERBOX OY, Lahti (FI)

(72) Inventor: Evgeny Lykov, Metsakyla (FI)

(73) Assignee: WATERBOX OY, Lahti (FI)

( * ) Notice: Subject to any disclaimer, the term of this patent is extended or adjusted under 35 U.S.C. 154(b) by 305 days.

(21) Appl. No.: 13/939,398

(22) Filed: Jul. 11, 2013

(65) Prior Publication Data

US 2014/0017649 A1    Jan. 16, 2014

(30) Foreign Application Priority Data

Jul. 11, 2012    (WO) .................. PCT/FI2012/050726

(51) Int. Cl.
*B63B 29/18* (2006.01)
*A63B 69/00* (2006.01)
*B63B 38/00* (2006.01)
*B63B 35/73* (2006.01)
*E04H 4/00* (2006.01)
*B63C 11/49* (2006.01)
*A63J 99/00* (2009.01)
*B63B 35/44* (2006.01)

(52) U.S. Cl.
CPC .................. *A63B 69/00* (2013.01); *B63B 29/18* (2013.01); *B63B 35/73* (2013.01); *B63B 38/00* (2013.01); *B63C 11/49* (2013.01); *E04H 4/0012* (2013.01); *A63J 99/00* (2013.01); *B63B 2035/4426* (2013.01)

(58) Field of Classification Search
CPC  B63B 29/18; B63B 2035/4426; B63B 43/06; B63B 2207/02; B63B 35/73; A63J 99/00; E04H 4/00; B63C 11/49; B67D 99/00
USPC .......................................................... 434/254
See application file for complete search history.

(56) References Cited

U.S. PATENT DOCUMENTS 3,240,186 A * 3/1966 Dobell ......................... 119/245
3,708,991 A    1/1973 Barkley

FOREIGN PATENT DOCUMENTS

| FR | 2 887 514 | 12/2006 |
|---|---|---|
| JP | 4 102670 | 4/1992 |
| JP | 04102670 A * | 4/1992 |
| JP | 5 248109 | 9/1993 |

OTHER PUBLICATIONS

International Search Report dated Mar. 20, 2013, corresponding to PCT/FI2012/050726.

* cited by examiner

*Primary Examiner* — Robert J Utama
*Assistant Examiner* — Jennifer Fassett
(74) *Attorney, Agent, or Firm* — Young & Thompson

(57) ABSTRACT

An apparatus for underwater activities including a vessel filled fully or partially with water, which vessel includes one or more open openings for entering the vessel, wherein the lower portion of the vessel is located within a body of water, all of the one or more open opening for entering the vessel are located in that portion of the vessel which is located under the surface level of the body of water, and that walls of the vessel are transparent, or the walls include sections that are transparent, for allowing observation of the activities taking place inside the vessel from outside of the vessel.

9 Claims, 5 Drawing Sheets

APPARATUS FOR UNDERWATER ACTIVITIES

The present invention relates to an apparatus for underwater activities, such as underwater sports, training and scuba diving, for example. More precisely the present invention relates to an apparatus for underwater activities comprising a vessel fully or partially filled with water, which vessel is equipped with one or more open openings for entering the vessel and water within it.

BACKGROUND OF THE INVENTION

For humans the underwater environment is hostile and continued existence underwater require special means, mainly for providing breathing air underwater. Thus all actions taking place underwater include certain risks for humans. When these risks are combined with the natural fear that majority of humans have for deep underwater places, most people never try any kind of underwater activities.

Thus there is a need for arrangements that provide possibility for people to try out or to train various underwater activities without the major risks and fears associated to these types of activities.

Further, any activities or sports taking place underwater are somewhat problematic in view of the spectators.

SUMMARY OF THE INVENTION

The present invention provides a solution for the above-mentioned problems relating to underwater activities. In the apparatus according to the present invention a vessel is provided which vessel comprises one or more open openings for entering the vessel and which vessel is filled fully or partially with water. The vessel is located within a body of water in such a way that the lower portion of the vessel is within the body of water, and all of the open openings for entering the vessel are located in the lower portion of the vessel under the surface level of the body of water. The walls of the vessel or portions of the walls of the vessel located above surface level of the body of water are transparent in order to allow spectators outside the vessel to observe activities taking place inside the vessel.

The arrangement according to present invention provides mass of water located within the vessel that is above water level of the surrounding body of water, where the activities taking place inside the water mass inside the vessel can be observed by spectators. With the arrangement according to the present invention underwater sports can be easily followed and observed outside the vessel, and underwater activities can be tried out and trained without the usual fear of the deep associated to these types of activities.

In the present invention the portion of the vessel located above the surface level of the surrounding body of water can be fully or partially filled with water. In the context of the present invention the partial filling of vessel with water means that the surface level of the water inside the vessel is substantially higher than the water level of the surrounding body of water. This is required in order to provide suitable water mass inside the vessel for underwater activities, but the full or complete filling of the vessel is not necessarily always required.

In an advantageous embodiment of the invention the apparatus comprises a floating platform connected to the vessel for supporting the vessel and keeping the vessel partially above surface level of the body of water, which floating platform advantageously provides space for spectators. In this type of arrangement, the vessel together with a suitable space for spectators can be located on lakes or rivers or seas or oceans, etc. for example near popular beaches. The floating platform may also be equipped with means for moving the floating platform on the surface of the surrounding body of water, such as motors with propellers, for example.

In an alternative advantageous embodiment of the invention the apparatus comprises a solid support structure for supporting the vessel and keeping the vessel partially above the surface level of the body of water. In this type of arrangement the vessel can be used in swimming pools or other smaller bodies of water on land. The vessel and the surrounding body of water can also be constructed as a single and complete constructional entity located on ground.

In an advantageous embodiment of the invention the apparatus comprises means for filling the vessel with water, means for removing water from the vessel, means for removing air from the vessel, and means for feeding air to the vessel. With these means the water and possible air located within the vessel can be changed periodically or continuously. Means for removing air from the vessel, such as air suction pumps for example, are required especially in those cases where the vessel located above surface of the water is empty of water and need to be filled with water in order to create underpressure inside the vessel and thus prevent the water brought inside the vessel to remain there and not to escape to the surrounding body of water.

In an advantageous embodiment of the invention the vessel is equipped with an air-lock-type means for entering the vessel from the portion of the vessel located above surface level of the body of water. This allows for alternative access inside the vessel in addition to the open openings of the vessel located under the surface level of the surrounding body of water.

In an advantageous embodiment of the invention the vessel is equipped with means for allowing water to quickly escape from the vessel. These means can be for example a closed opening in the top wall or surface of the vessel and thus located above the surface level of the surrounding water, which opening can be quickly opened and when opened allows air to flow within the vessel and water to escape from the vessel quickly. This is advantageous in cases of emergencies taking place in the water inside the vessel.

In an advantageous embodiment of the invention the vessel is equipped with a suitable surface, such as a platform for example, located inside the vessel and at the lower portion of the vessel. This surface is connected to suitable surfaces of the vessel in order to keep the surface in its place. The surface is placed at a distance from the closest surfaces of the vessel so as to allow entrance to the area above the surface inside the vessel.

The features defining an apparatus according to the present invention are presented more precisely in claim 1. Other advantageous embodiments and features are disclosed in dependent claims.

BRIEF DESCRIPTION OF THE DRAWINGS

Exemplifying embodiments of the invention and their advantages are explained in greater detail below in the sense of example and with reference to accompanying drawings, where.

DETAILED DESCRIPTION OF THE PREFERRED EMBODIMENTS

Figure 1:
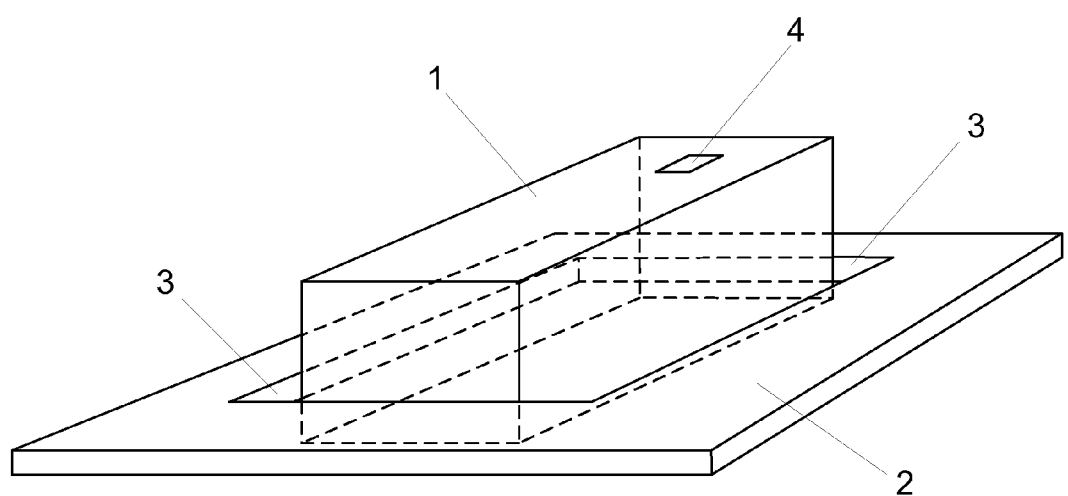
FIG. 1 shows a schematic view of an apparatus according to an embodiment of the invention.

FIG. 1 show a schematic view of an apparatus according to one embodiment of the invention, where the apparatus comprises a vessel 1 connected to a floating platform 2.

In this embodiment the floating platform 2 support the vessel 1 and keep it floating above a suitable body of water such as a lake or river or sea, for example. The vessel 1 is connected to a surface of the floating platform 2 through the end surfaces of the vessel, and between the side surfaces and the floating platform there is provided a space 3 for diving from the platform inside the vessel.

The vessel 1 is formed of transparent plastic of glass material and in a form of a cuboid, and the bottom surface of the vessel is open for allowing entrance inside the vessel. The bottom edges of the sides of the vessel 1 defining the open bottom surface of the vessel extend below the bottom surface of the floating platform 2 in order to guarantee that these edges remain below the surface level of the surrounding body of water.

The transparency of the vessel 1 makes is possible for spectators located outside the vessel to observe activities taking place inside the vessel. On the top surface on the vessel 1 there is a closable opening 4, which can be used for quick release of water inside the vessel in cases of emergency for example. The closable opening 4 is covered with a lid that opens inside the vessel 1, so that the simple release of the locking of the lid will cause the lid to immediately open.

The connection between the vessel 1 and the floating platform 2 is advantageously such, that the vessel can be lowered to be wholly submerged in the body of water and then be lifted partially above the surface level again in order to fill the vessel with water. The closable opening 4 at the top surface of the vessel 1 will be opened when the vessel is submerged in order to allow air to escape from inside the vessel during submerging of the vessel, and the opening is closed when the vessel is full or almost full of water before lifting the vessel in order to keep the vessel filled with water during the raising of the vessel. This type of connection between the vessel and the floating platform can be achieved, for example, with a slidable connection allowing the vessel to be moved in vertical direction with respect to the floating platform and with power generating means providing required power for lifting the water filled vessel up, which are evident to a person skilled in the art.

The floating platform 2 is large enough to provide space for spectators observing activities taking place inside the water filled vessel 1. The floating platform 2 can be equipped with seating for spectators and can be made large enough to include suitable facilities for providing food and beverages to the spectators as well as other services, for example.

The floatability of the floating platform 2 can be achieved with suitable floatable material of the floating platform and/or with pontoons and floats.

Figure 2:
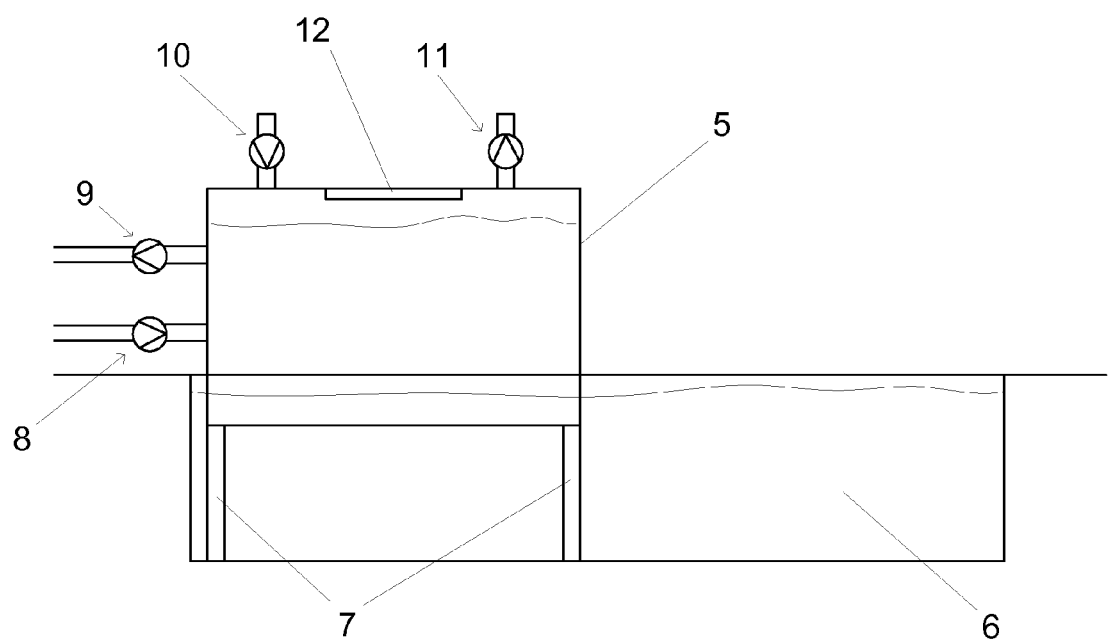
FIG. 2 shows a schematic view of an apparatus according to an alternative embodiment of the invention.

FIG. 2 shows a schematic view of an apparatus according to an alternative embodiment of the invention, where vessel 5 is located partially inside swimming pool 6.

In this embodiment the vessel 5 made of transparent material is filled partially with water and supported with support structure, in this case with legs 7, on the bottom of the swimming pool 6. The vessel 5 has the lower surface located under the water level of the swimming pool 6 open in order to allow entrance inside the vessel and water located inside. In this context the partial filling of vessel 5 with water means that the surface level of the water inside the vessel is substantially higher than the water level of the surrounding body of water in order to provide suitable amount of water inside the vessel for underwater activities.

The vessel 5 is filled fully or partially with water with a water inlet pipe and pump 8, and the water inside the vessel is drained with an outlet pipe and pump 9, when the vessel is filled fully or partially with water in order to create water circulation inside the vessel. When the vessel 5 is drained from water, both pipes and pumps 8 and 9 can be used in this process, simply by changing the pumping direction with relevant pump in inlet direction. The outlet pipe and pump 9 can similarly be used for filling the vessel 5 with water.

The upper surface of the vessel 5 is equipped with inlet and outlet air ducts and pumps 10 and 11. The outlet air duct and pump 11 is required for creating partial vacuum or underpressure inside the vessel 5 when the vessel is filled with water so that the water will remain inside the vessel and not flow out of there. When suitable water level inside the vessel 5 is reached, the inlet air duct and pump 10 is activated in order to keep the suitable water level inside the vessel and provide changing air inside the unfilled portion of the vessel. Simultaneously either the water inlet pipe and pump 8 is turned off, or the water outlet pipe and pump 9 is activated.

The upper surface of the vessel 5 is also equipped with closable opening 12, which can be used emergency emptying of the vessel, or to help emptying the vessel when it is otherwise drained through the water pipes and pumps 8 and 9, for example.

Figure 3A:
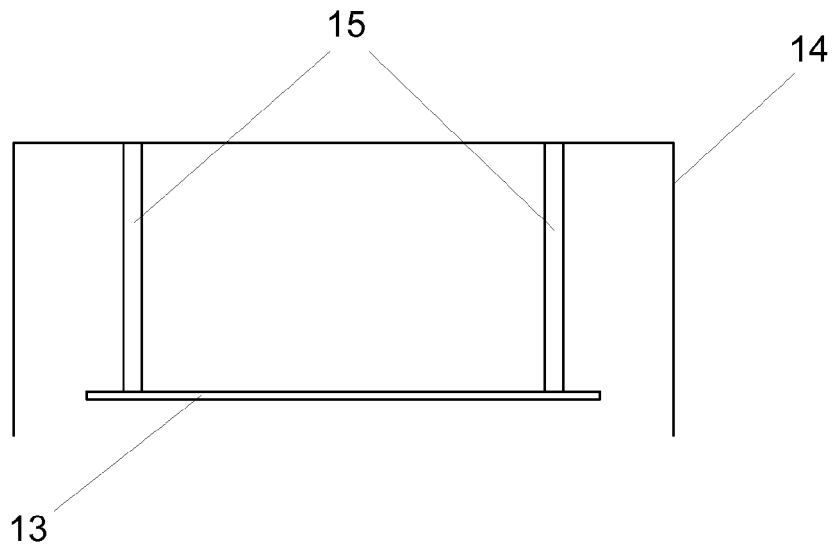
FIGS. 3A and 3B show schematically two arrangements for attaching a surface to an apparatus according to the invention.
Figure 3B:
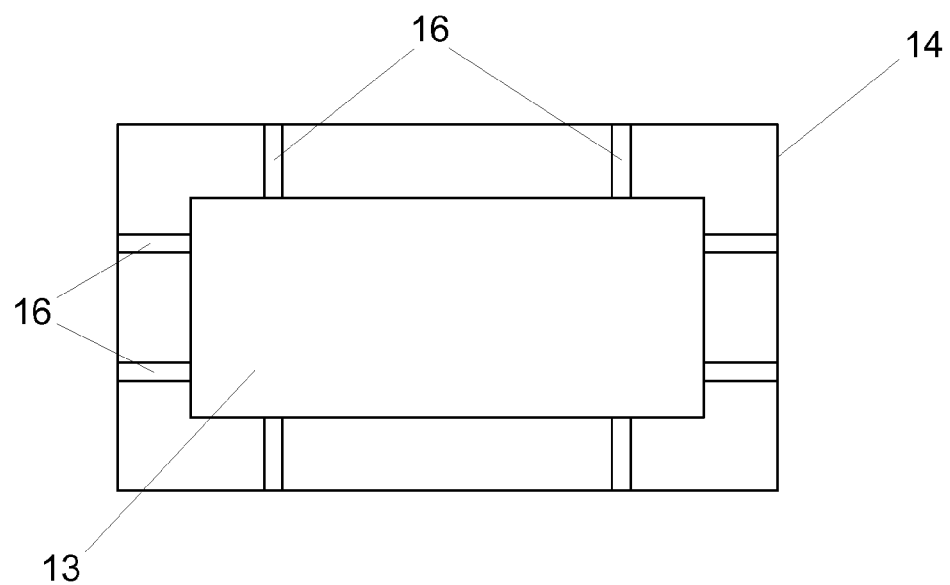

FIGS. 3A and 3B show schematically two arrangements for attaching a surface 13 to a vessel 14 in an apparatus according to the present invention. FIG. 3A show a side view of the vessel 14 and surface 13 in the first arrangement embodiment, and FIG. 3B show bottom view of the vessel 14 and surface 13 in the second arrangement embodiment.

The surface 13 can be used to create a playing field for underwater sports and games taking place inside the vessel 14 for example. The surface 13 keeps the game means, such as ball or puck, inside the vessel 14 and the game field can be drawn or painted on the surface. The surface 13 is advantageously made of plastic.

In the embodiment of FIG. 3A the surface 13 is connected to the upper surface or ceiling of the vessel 14 with vertically extending plastic or metal pipes 15 or with similar means. The pipes 15 are connected to the corner areas of the surface 13 so that the connecting pipes do not create obstacles for the game.

In the embodiment of FIG. 3B the surface 13 is connected only to the side and end surfaces of the vessel 14 with horizontally extending connecting pipes 16 or similar means.

The surface 13 is located inside the vessel 14 so that there is space between all sides of the surface and all side surfaces of the vessel. These spaces provide entrance and exits on and off the space located above the surface 13 inside the vessel 14.

In the present invention the vessel can have for example following dimensions: length 25 m, width 15 m and height 5 m. The distance between the surface 13 and the upper surface or ceiling of the vessel can be for example 4 m, and the surface can have length of 18 m and width of 10 m, for example.

Figure 4A:
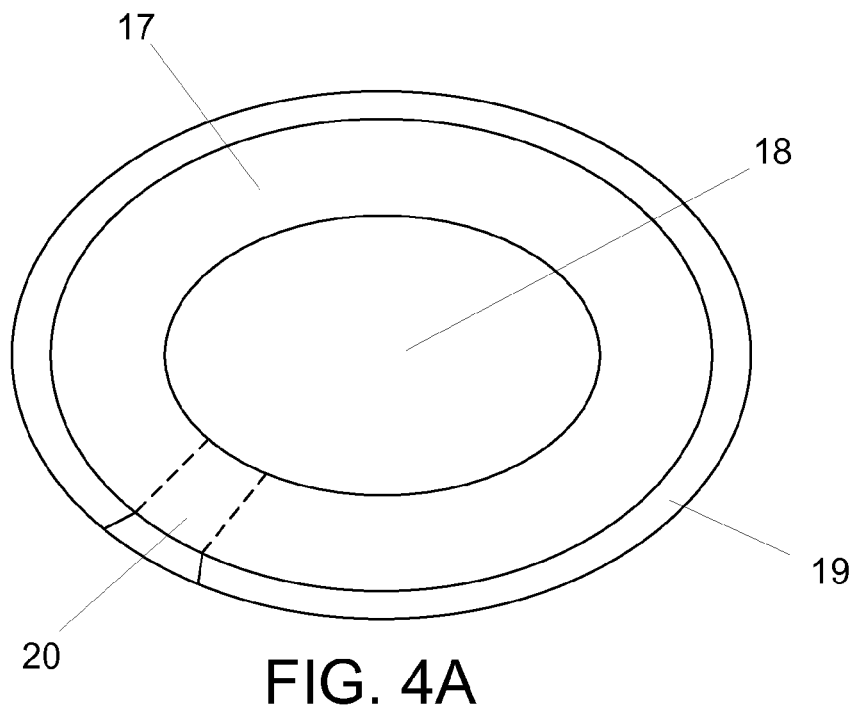
FIGS. 4A and 4B show schematic top views of two vessels for an apparatus according to the invention.
Figure 4B:
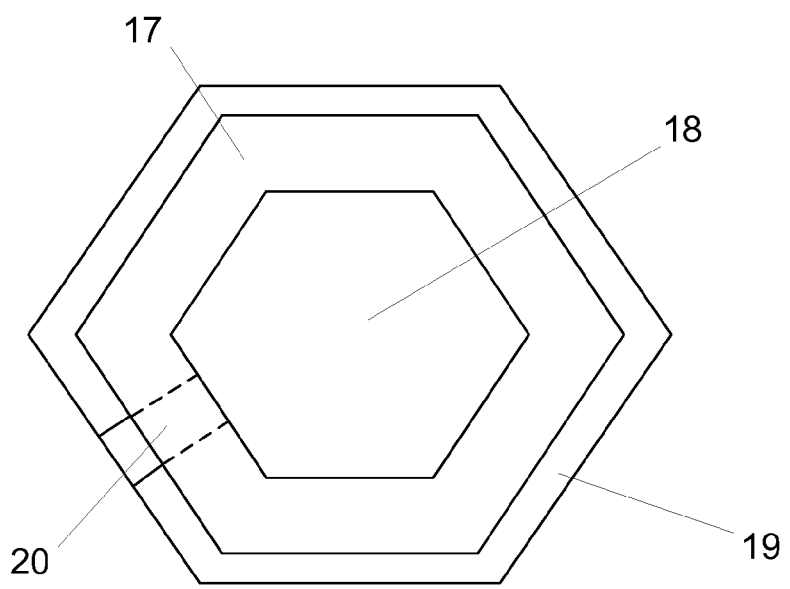

FIGS. 4A and 4B show schematic top views of vessels 17 for an embodiment of an apparatus of the invention. In the embodiments of these figures, the vessels 17, formed as circular or angular entities, define open space 18 in the middle for spectators, in addition to the room surrounding the vessel. Next to the outer edge of the vessel 17 there is arranged a space 19 for entering the fully or partially water filled vessel.

Passage 20 is arranged for entering the open space 18 in the middle of vessel 17, which passage comprise bridge over the space 19 and tunnel through vessel 17.

Figure 5A:
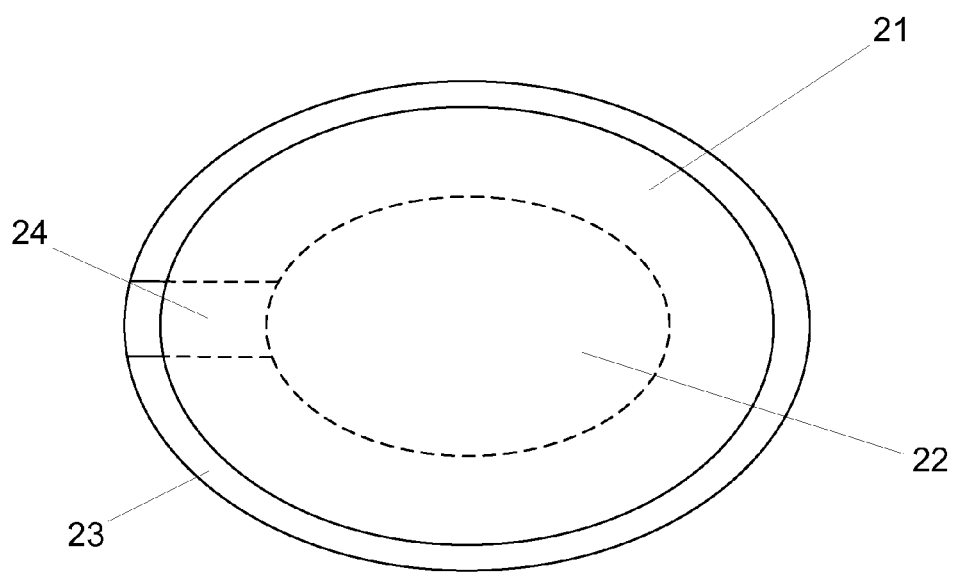
FIGS. 5A and 5B show schematically an apparatus according to another alternative embodiment of the invention.
Figure 5B:
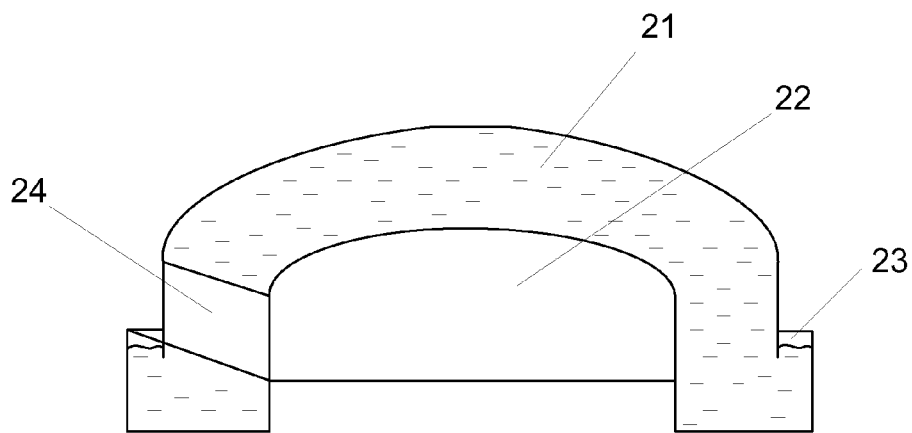

FIGS. 5A and 5B show schematically an apparatus according to another alternative embodiment of the invention. FIG. 5A show schematic top view of the apparatus, and FIG. 5B show schematic cross-sectional side view of the apparatus.

In this embodiment a vessel 21 covers an inner space 22 for spectators. The vessel 21 is surrounded with a space 23 for entering the fully or partially water filled vessel. A passage 24 is provided for spectators for entering the inner space 22, which passage goes over the space 23 and through vessel 21 to the inner space.

As can be seen from the above discussion of the embodiments shown in attached Figures, the apparatus according to the present invention can be implemented as a single floating construction, as a combined construction with already existing pool of water on ground, or as a single constructional entity comprising surrounding pool or body of water. For example, the embodiment of FIGS. 5A and 5B can be a floating entity or it can be single constructional entity build on ground and comprising a pool for required surrounding body of water. Thus it is evident that any of the above discussed embodiments, or variations of these embodiments, or combinations of these embodiments, evident to a person skilled in the art can be applied as floating constructions or as structures located on ground comprising a suitable pool or body of water, for example.

The specific exemplifying embodiments of the invention shown in Figures and discussed above should not be construed as limiting. It is evident to a person skilled in the art that the vessel can be made of any suitable shapes and sizes, and of any suitable transparent material. Further, the required transparency can alternatively be achieved by providing transparent parts or sections in the walls of the vessel. Also, a suitable space or room for spectators can also be provided inside the wall of the vessel. Thus, the invention is not limited merely to the embodiments described above.

The invention claimed is:

1. An apparatus for underwater activities, comprising:
   a vessel filled fully or partially with water, the vessel having one or more open openings for entering the vessel,
   wherein a lower portion of the vessel is located within a surrounding body of water, a surface level of the water inside the vessel being substantially higher than the surrounding body of water, an inside of the vessel being under pressure in order to keep the water inside the vessel,
   wherein all of the one or more open openings for entering the vessel are located in the lower portion of the vessel located under the surface level of the surrounding body of water, and
   wherein walls of the vessel are transparent or the walls comprise sections that are transparent such to permit observation of the activities taking place inside the vessel from outside of the vessel.

2. The apparatus according to claim 1, further comprising:
   a floating platform connected to the vessel for supporting the vessel and keeping the vessel partially above surface level of the surrounding body of water, which floating platform advantageously provides space for spectators.

3. The apparatus according to claim 1, further comprising:
   a solid support structure for supporting the vessel and keeping the vessel partially above the surface level of the surrounding body of water.

4. The apparatus according to claim 1, wherein the apparatus is a constructional entity located on ground and comprising a surrounding pool of water.

5. The apparatus according to claim 1, further comprising:
   a space for spectators surrounded by and/or covered by the vessel.

6. The apparatus according to claim 1, further comprising:
   means for filling the vessel with water;
   means for removing water from the vessel;
   means for removing air from the vessel; and
   means for feeding air to the vessel.

7. An apparatus according to claim 1, wherein the vessel is equipped with means for allowing water to quickly escape from the vessel.

8. The apparatus according to claim 1, wherein the vessel is equipped with a surface or platform located inside the vessel and at the lower portion of the vessel, and at a distance from the closest surfaces of the vessel.

9. The apparatus according to claim 1, wherein inside the walls of the vessel there is provided space for spectators.

\* \* \* \* \*